US011209951B2

(12) United States Patent
Fu et al.

(10) Patent No.: US 11,209,951 B2
(45) Date of Patent: Dec. 28, 2021

(54) METHOD AND APPARATUS FOR DISPLAYING APPLICATION PROGRAM, TERMINAL DEVICE, AND STORAGE MEDIUM (71) Applicant: GUANGDONG OPPO MOBILE TELECOMMUNICATIONS CORP., LTD., Guangdong (CN)

(72) Inventors: Liangjing Fu, Guangdong (CN); Zhiyong Lin, Guangdong (CN); Tongxi Li, Guangdong (CN); Lei Jing, Guangdong (CN)

(73) Assignee: SHENZHEN HEYTAP TECHNOLOGY CORP., LTD., Shenzhen (CN)

( * ) Notice: Subject to any disclaimer, the term of this patent is extended or adjusted under 35 U.S.C. 154(b) by 0 days.

(21) Appl. No.: 17/195,168

(22) Filed: Mar. 8, 2021

(65) Prior Publication Data

US 2021/0191580 A1 Jun. 24, 2021

Related U.S. Application Data (63) Continuation of application No. PCT/CN2019/096547, filed on Jul. 18, 2019.

(30) Foreign Application Priority Data

Sep. 21, 2018 (CN) .......................... 201811105688.4

(51) Int. Cl.
*G06F 3/0481* (2013.01)
(52) U.S. Cl.
CPC ................................. *G06F 3/0481* (2013.01)
(58) Field of Classification Search
CPC .................................................... G06F 3/0481
See application file for complete search history.

(56) References Cited

U.S. PATENT DOCUMENTS 5,819,055 A * 10/1998 MacLean .............. G06F 3/0481
715/798
5,923,326 A * 7/1999 Bittinger ............... G06F 3/0481
715/805
(Continued)

FOREIGN PATENT DOCUMENTS

CN      103475784 A    12/2013
CN      104090720 A    10/2014
(Continued)

OTHER PUBLICATIONS

Android n opens free form interface with English Translation, https://blog.csdn.net/dzy_mails/article/details/52943992, Published in Oct. 27, 2016 (3 pages).
(Continued)

*Primary Examiner* — Shen Shiau
(74) *Attorney, Agent, or Firm* — Young Basile Hanlon & MacFarlane, P.C.

(57) ABSTRACT

A method for displaying an application program, a terminal device, and a storage medium which are applied to intelligent terminals. The method includes: determining whether an application program to be currently started is displayed by means of a Freeform window; if the application program to be currently started is displayed by means of a Freeform window, acquiring a display interface specified by the application program and corresponding to a work task; and after the application program is started, displaying the acquired specified display interface corresponding to the work task in a Freeform window as a display interface of the application program.

7 Claims, 4 Drawing Sheets

(56) References Cited

U.S. PATENT DOCUMENTS

| | | | | |
|---|---|---|---|---|
| 5,995,103 | A * | 11/1999 | Ashe | G09G 5/14 |
| | | | | 715/804 |
| 6,509,912 | B1 | 1/2003 | Moran et al. | |
| 10,254,942 | B2 * | 4/2019 | Vranjes | G06F 3/04847 |
| 10,976,887 | B2 * | 4/2021 | Hao | G06F 3/0481 |
| 2006/0059556 | A1 | 3/2006 | Royer | |
| 2006/0123353 | A1 * | 6/2006 | Matthews | G06F 3/0482 |
| | | | | 715/779 |
| 2009/0083655 | A1 * | 3/2009 | Beharie | G06F 3/0481 |
| | | | | 715/781 |
| 2011/0246880 | A1 * | 10/2011 | Horton | G06F 3/0481 |
| | | | | 715/708 |
| 2012/0005607 | A1 * | 1/2012 | Tofinetti | G06F 3/0483 |
| | | | | 715/769 |
| 2013/0080759 | A1 * | 3/2013 | Reeves | G06F 1/1637 |
| | | | | 713/100 |
| 2013/0080899 | A1 * | 3/2013 | Reeves | G06F 3/0481 |
| | | | | 715/733 |
| 2013/0080969 | A1 * | 3/2013 | Reeves | G06F 1/1641 |
| | | | | 715/788 |
| 2013/0104051 | A1 * | 4/2013 | Reeves | G06F 3/1423 |
| | | | | 715/748 |
| 2013/0198692 | A1 * | 8/2013 | Lin | G06F 3/0483 |
| | | | | 715/835 |
| 2013/0214996 | A1 | 8/2013 | Reeves et al. | |
| 2013/0305184 | A1 * | 11/2013 | Kim | G06F 3/0482 |
| | | | | 715/781 |
| 2014/0040826 | A1 * | 2/2014 | Wei | G06F 3/0488 |
| | | | | 715/810 |
| 2014/0237367 | A1 * | 8/2014 | Jung | G06F 3/04845 |
| | | | | 715/728 |
| 2014/0237420 | A1 * | 8/2014 | Song | G06F 3/04845 |
| | | | | 715/790 |
| 2015/0074687 | A1 * | 3/2015 | Ji | G06F 9/543 |
| | | | | 719/318 |
| 2016/0062639 | A1 * | 3/2016 | Hwang | G06F 3/04817 |
| | | | | 715/783 |
| 2016/0334989 | A1 * | 11/2016 | Liu | G06F 3/0488 |
| 2016/0352778 | A1 | 12/2016 | Chari et al. | |
| 2016/0370864 | A1 * | 12/2016 | Choi | G06F 3/017 |
| 2017/0031532 | A1 * | 2/2017 | Vasudevan | G06F 3/0481 |
| 2017/0364210 | A1 * | 12/2017 | Zhang | G06F 3/0481 |
| 2018/0052571 | A1 * | 2/2018 | Seol | G06F 3/0482 |
| 2018/0121065 | A1 * | 5/2018 | Seo | G06F 3/04817 |
| 2018/0246634 | A1 * | 8/2018 | Suh | G06F 3/0481 |
| 2018/0284948 | A1 * | 10/2018 | Hao | G06F 3/0482 |
| 2018/0350119 | A1 * | 12/2018 | Kocharlakota | G06F 3/012 |
| 2019/0025988 | A1 * | 1/2019 | Liu | G06F 3/0481 |
| 2020/0169596 | A1 * | 5/2020 | Qu | G06F 16/168 |
| 2020/0278775 | A1 * | 9/2020 | Tao | G06F 3/0482 |
| 2020/0286449 | A1 * | 9/2020 | Yang | G06F 3/14 |
| 2020/0304626 | A1 * | 9/2020 | Phillips | G07F 9/023 |
| 2020/0341633 | A1 * | 10/2020 | Lu | G06F 3/0484 |
| 2020/0342338 | A1 * | 10/2020 | Huang | G06F 9/44578 |
| 2020/0371667 | A1 * | 11/2020 | Chen | G06F 3/0482 |
| 2020/0409512 | A1 * | 12/2020 | Jing | G06F 3/04845 |
| 2021/0048939 | A1 * | 2/2021 | Song | G06F 3/04886 |
| 2021/0173550 | A1 * | 6/2021 | Song | G06F 3/0483 |

FOREIGN PATENT DOCUMENTS

| | | |
|---|---|---|
| CN | 105468437 A | 4/2016 |
| CN | 107273111 A | 10/2017 |
| CN | 107918515 A | 4/2018 |
| CN | 108363593 A | 8/2018 |
| CN | 109358927 A | 2/2019 |
| CN | 108363593 B | 1/2020 |

OTHER PUBLICATIONS

Android n multi window function with English Translation, https://www.jianshu.com/p/9061b5b550fc, Published in May 31, 2017 (26 pages).

Android free form mode with English Translation, https://blog.csdn.net/kavin_ma/article/details/79000549, Published in Jan. 8, 2018 (12 pages).

Chinese First office action with English Translation of Chinese application No. 201811105688.4 dated Dec. 12, 2019 (15 pages).

Notification to Grant Patent Right for Invention with English Translation of Chinese application No. 201811105688.4, dated Apr. 3, 2020 (4 pages).

International search reportwith English Translation of International application No. PCT/CN2019/096547 dated Oct. 16, 2019 (15 pages).

Extended European Search Report for EP Application 19862434.8 dated Oct. 22, 2021. (9 pages).

* cited by examiner

FIG. 5

METHOD AND APPARATUS FOR DISPLAYING APPLICATION PROGRAM, TERMINAL DEVICE, AND STORAGE MEDIUM

CROSS-REFERENCE TO RELATED APPLICATION(S)

The present application is a continuation-application of International (PCT) Patent Application No. PCT/CN2019/096547 filed on Jul. 18, 2019, which claims priority of Chinese Patent Application No. 201811105688.4, filed on Sep. 21, 2018, the entire contents of both of which are hereby incorporated by reference.

TECHNICAL FIELD

The present disclosure relates to the technical field of intelligent terminals, and in particular, to a method for displaying an application program, a terminal device, and a computer readable storage medium.

BACKGROUND

At present, multi-window is a kind of user scenario of a smart terminal in the Android system.

When using multi-window, users have high requirements for quickness of multi-window operations, whether it is convenient to enter and exit, and whether it is humanized. In addition, users will also associate multi-window operation experience with performance and intuitive experience of Android system smart terminals, which will further affect brands and reputation of the Android system smart terminals.

SUMMARY

In view of this, embodiments of the present disclosure provide a method for displaying an application program, a terminal device, and a storage medium so as to solve the problem that an existing Android system does not process an interface for multi-window display in a multi-window scenario and thus result in that a speed for a user to activate a specified interface is too slow.

A first aspect of an embodiment of the present disclosure provides a method for displaying an application program, comprising: determining whether an application program to be currently started is displayed by means of a Freeform window; in response to that the application program to be currently started is displayed by means of a Freeform window, acquiring a display interface corresponding to a work task specified by the application program; and in response to that the application program is started, displaying the acquired display interface corresponding to the specified work task in a Freeform window as a display interface of the application program.

A second aspect of an embodiment of the present disclosure provides a terminal device comprising a memory, a processor, and a computer program stored in the memory and being executable in the processor, the processor, when executing the computer program, implements operations of the method for displaying an application program.

A third aspect of an embodiment of the present disclosure provides a non-transitory computer readable storage medium, the computer readable storage medium stores a computer program, the computer program, when being executed by a processor, implements operations of the method for displaying an application program.

BRIEF DESCRIPTION OF DRAWINGS

In order to describe technical solutions in embodiments of the present disclosure more clearly, drawings required being used in description of the embodiments or the prior art will be simply introduced below. Obviously, the drawings in the following description are merely some embodiments of the present disclosure. For one of ordinary skill in the art, it is also possible to obtain other drawings according to these drawings without paying any creative work.

DETAILED DESCRIPTION

In the following description, for the purpose of illustration rather than limitation, specific details such as a specific system structure and technology are proposed for thorough understanding of the embodiments of the present disclosure. However, it should be clear to those skilled in the art that the present disclosure can also be implemented in other embodiments without these specific details. In other cases, detailed descriptions of well-known systems, devices, circuits, and methods are omitted to avoid unnecessary details from obstructing the description of this application.

In order to illustrate the technical solution described in the present disclosure, description is performed through specific embodiments below.

It should be understood that when being used in this specification and appended claims, a term "comprises" existence of described features, wholes, steps, operations, elements and/or components, but does not exclude existence or addition of one or more other features, wholes, steps, operations, elements, components, and/or combinations thereof.

It should also be understood that the terms used in the specification of the present disclosure are only for the purpose of describing specific embodiments and are not intended to limit the present disclosure. As used in the specification and the appended claims of the present disclosure, unless the context clearly indicates other circumstances, the singular forms "a", "an" and "the" are intended to include plural forms.

It should be further understood that the term "and/or" used in the specification and appended claims of the present disclosure refers to any combination and all possible combinations of one or more of the associated listed items, and includes these combinations.

As used in this specification and the appended claims, the term "if" can be interpreted as "when" or "once" or "in response to determination" or "in response to detection" depending on the context. Similarly, the phrase "if determined" or "if detected [described condition or event]" can be interpreted as meaning "once determined" or "in response to determination" or "once detected [described condition or event]" or "in response to detection of [condition or event described]" depending on the context.

In specific implementation, the mobile terminal described in the embodiments of the present disclosure includes, but is not limited to, mobile phones with touch-sensitive surfaces (for example, touch screen displays and/or touch pads), laptop computers, or other portable devices such as tablet computers. It should also be understood that in some embodiments, the above-mentioned devices are not portable communication devices but desktop computers with touch-sensitive surfaces (for example, touch screen displays and/or touch pads).

In the following discussion, a mobile terminal including a display and a touch-sensitive surface is described. However, it should be understood that the mobile terminal may include one or more other physical user interface device, such as a physical keyboard, a mouse, and/or a joystick.

The mobile terminal supports various application programs, such as one or more of the following: a drawing application program, a presentation application program, a word processing application program, a website creation application program, a disk burning application program, a spreadsheet application program, a game application program, a phone application program, a video conferencing application program, an email application program, an instant message transceiving application program, an exercise support application program, a photo management application program, a digital camera application program, a digital photographer application program, a web browsing application program, a digital music player application program, and/or a digital video player application program.

Various applications that can be executed on the mobile terminal can use at least one common physical user interface device such as a touch-sensitive surface. One or more functions of the touch-sensitive surface and corresponding information displayed on the terminal can be adjusted and/or changed between applications and/or within corresponding applications. In this way, the common physical architecture of the terminal (for example, a touch-sensitive surface) can support various application programs with a user interface that is intuitive and transparent to the user.

A first aspect of the present disclosure provides a method for displaying an application program, comprising: determining whether an application program to be currently started is displayed by means of a Freeform window; in response to that the application program to be currently started is displayed by means of a Freeform window, acquiring a display interface corresponding to a work task specified by the application program; and in response to that the application program is started, displaying the acquired display interface corresponding to the specified work task in a Freeform window as a display interface of the application program.

In some embodiments, the acquiring a display interface corresponding to a work task specified by the application program comprises: acquiring a work task executed in the last time by the application program, and using a display interface corresponding to the work task executed in the last time as a display interface corresponding to a specified work task.

In some embodiments, the method, prior to the acquiring a work task executed in the last time by the application program, and using a display interface corresponding to the work task executed in the last time as a display interface corresponding to a specified work task, further comprises: determining whether the display interface corresponding to a work task executed in the last time by the application program is acquired by skipping from a display interface of another application program; the acquiring a work task executed in the last time by the application program, and using a display interface corresponding to the work task executed in the last time as a display interface corresponding to a specified work task comprises: in response to determining that the display interface corresponding to a work task executed in the last time by the application program is not acquired by skipping from a display interface of another application program, acquiring a display interface corresponding to a work task executed in the last time by the application program, and using a display interface corresponding to the work task executed in the last time as a display interface corresponding to a specified work task.

In some embodiments, the method further comprises: in response to that the display interface corresponding to a work task executed in the last time by the application program is acquired by skipping from a display interface of another application program, acquiring a display interface before skipping, and using the display interface before skipping as the display interface corresponding to the specified work task.

In some embodiments, in response to that there are a plurality of display interfaces before skipping, the acquiring a display interface before skipping, and using the display interface before skipping as the display interface corresponding to the specified work task comprises: acquiring a display interface before skipping, and using a display interface before the first skipping as the display interface corresponding to the specified work task.

In some embodiments, the acquiring a display interface corresponding to a work task specified by the application program comprises: in response to that the application program is displayed in a manner of at least two Freeform windows before the last exiting, acquiring a display interface on which a focus staying for the longest time, and using the display interface on which a focus staying for the longest time as the display interface corresponding to the specified work task.

In some embodiments, the at least two Freeform windows are configured to start the same application program at the same time, and a difference between time points when closing the at least two Freeform windows is less than a preset time different threshold value.

In some embodiments, the at least two Freeform windows are configured to start the same application program at the same time, and a difference between time points when closing the at least two Freeform windows is less than a preset time different threshold value. in response to that an application program to be currently started is displayed by means of a Freeform window, a position of the application program in a screen when exiting in the last time and/or a size of a Freeform window corresponding to the application program when exiting in the last time are further acquired; the in response to that the application program is started, displaying the acquired display interface corresponding to the specified work task in a Freeform window as a current display interface of the application program comprises: in response to that the application program is started, displaying the acquired display interface corresponding to the specified work task in a Freeform window as a display interface of the application program, wherein a position of the Freeform window in a screen is the same as a position of the application program in the screen when exiting in the last time, and/or a size of the Freeform window is the same as a size of a Freeform window corresponding to the application program when exiting in the last time.

In some embodiments, in response to that an application program to be currently started is displayed by means of a Freeform window, a position of the application program in a screen when exiting in the last time and a size of a Freeform window corresponding to the application program when exiting in the last time are further required; the in response to that the application program is started, displaying the acquired display interface corresponding to the specified work task in a Freeform window as a display interface of the application program comprises: in response to that the application program is started, determining whether a position of a Freeform window displayed on a current screen is the same as a position of the application program in the screen when exiting in the last time is determined; in response to that they are the same, determining whether an area of the current screen that does not display any Freeform window is larger than or equal to a size of a Freeform window corresponding to the application program when exiting in the last time; in response to that the area is larger than or equal to a size of a Freeform window corresponding to the application program when exiting in the last time, displaying the acquired display interface corresponding to the specified work task in a Freeform window as a display interface of the application program; wherein a size of the Freeform window is the same as a size of a Freeform window corresponding to the application program when exiting in the last time, and a position of the Freeform window in the screen is in the area of the current screen that does not display any Freeform window.

In some embodiments, the method further comprises: in response to that the application program to be currently started is displayed by a non-Freeform window manner, acquiring a display interface defaulted by the application program, and displaying the acquired defaulted display interface in the Freeform window as a display interface of the application program.

A second aspect of the present disclosure provides a terminal device comprising a memory, a processor, and a computer program stored in the memory and being executable in the processor, wherein the processor, when executing the computer program, implements operations of: determining whether an application program to be currently started is displayed by means of a Freeform window; in response to that the application program to be currently started is displayed by means of a Freeform window, acquiring a display interface corresponding to a work task specified by the application program; and in response to that the application program is started, displaying the acquired display interface corresponding to the specified work task in a Freeform window as a display interface of the application program.

In some embodiments, the acquiring a display interface corresponding to a work task specified by the application program comprises: acquiring a work task executed in the last time by the application program, and using a display interface corresponding to the work task executed in the last time as a display interface corresponding to a specified work task.

In some embodiments, the operations, prior to the acquiring a work task executed in the last time by the application program, and using a display interface corresponding to the work task executed in the last time as a display interface corresponding to a specified work task, further comprise: determining whether the display interface corresponding to a work task executed in the last time by the application program is acquired by skipping from a display interface of another application program; the acquiring a work task executed in the last time by the application program, and using a display interface corresponding to the work task executed in the last time as a display interface corresponding to a specified work task comprises: in response to determining that the display interface corresponding to a work task executed in the last time by the application program is not acquired by skipping from a display interface of another application program, acquiring a display interface corresponding to a work task executed in the last time by the application program, and using a display interface corresponding to the work task executed in the last time as a display interface corresponding to a specified work task.

In some embodiments, the operations further comprise: in response to that the display interface corresponding to a work task executed in the last time by the application program is acquired by skipping from a display interface of another application program, acquiring a display interface before skipping, and using the display interface before skipping as the display interface corresponding to the specified work task.

In some embodiments, in response to that there are a plurality of display interfaces before skipping, the acquiring a display interface before skipping, and using the display interface before skipping as the display interface corresponding to the specified work task comprises: acquiring a display interface before skipping, and using a display interface before the first skipping as the display interface corresponding to the specified work task.

In some embodiments, the acquiring a display interface corresponding to a work task specified by the application program comprises: in response to that the application program is displayed in a manner of at least two Freeform windows before the last exiting, acquiring a display interface on which a focus staying for the longest time, and using the display interface on which a focus staying for the longest time as the display interface corresponding to the specified work task.

In some embodiments, in response to that an application program to be currently started is displayed by means of a Freeform window, a position of the application program in a screen when exiting in the last time and/or a size of a Freeform window corresponding to the application program when exiting in the last time are further acquired; the after the application program is started, displaying the acquired display interface corresponding to the specified work task in a Freeform window as a current display interface of the application program comprises: after the application program is started, displaying the acquired display interface corresponding to the specified work task in a Freeform window as a display interface of the application program, wherein a position of the Freeform window in a screen is the same as a position of the application program in the screen when exiting in the last time, and/or a size of the Freeform window is the same as a size of a Freeform window corresponding to the application program when exiting in the last time.

In some embodiments, in response to that an application program to be currently started is displayed by means of a Freeform window, a position of the application program in a screen when exiting in the last time and a size of a Freeform window corresponding to the application program when exiting in the last time are further required; the after the application program is started, displaying the acquired display interface corresponding to the specified work task in a Freeform window as a display interface of the application program comprises: after the application program is started, determining whether a position of a Freeform window displayed on a current screen is the same as a position of the application program in the screen when exiting in the last time is determined; in response to that they are the same, determining whether an area of the current screen that does not display any Freeform window is larger than or equal to a size of a Freeform window corresponding to the application program when exiting in the last time; in response to that the area is larger than or equal to a size of a Freeform window corresponding to the application program when exiting in the last time, displaying the acquired display interface corresponding to the specified work task in a Freeform window as a display interface of the application program; wherein a size of the Freeform window is the same as a size of a Freeform window corresponding to the application program when exiting in the last time, and a position of the Freeform window in the screen is in the area of the current screen that does not display any Freeform window.

In some embodiments, the operations further comprise: in response to that the application program to be currently started is displayed by a non-Freeform window manner, acquiring a display interface defaulted by the application program, and displaying the acquired defaulted display interface in the Freeform window as a display interface of the application program.

A third aspect of the present disclosure provides a non-transitory computer readable storage medium, wherein the computer readable storage medium stores a computer program, and the computer program, when being executed by a processor, implements operations of: determining whether an application program to be currently started is displayed by means of a Freeform window; in response to that the application program to be currently started is displayed by means of a Freeform window, acquiring a display interface corresponding to a work task specified by the application program; and in response to that the application program is started, displaying the acquired display interface corresponding to the specified work task in a Freeform window as a display interface of the application program.

Embodiment I

Figure 1:
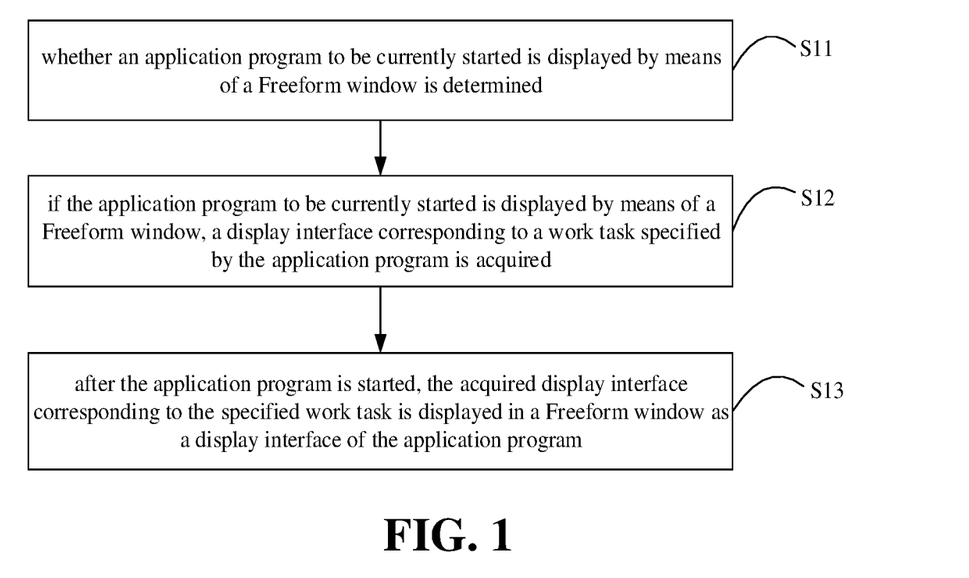
FIG. 1 is a flow chart of a first method for displaying an application program provided by an embodiment I of the present disclosure.

FIG. 1 shows a flow chart of a first method for displaying an application program provided by an embodiment I of the present disclosure, which is detailed as follows.

Step S11, whether an application program to be currently started is displayed by means of a Freeform window is determined.

Figure 2:
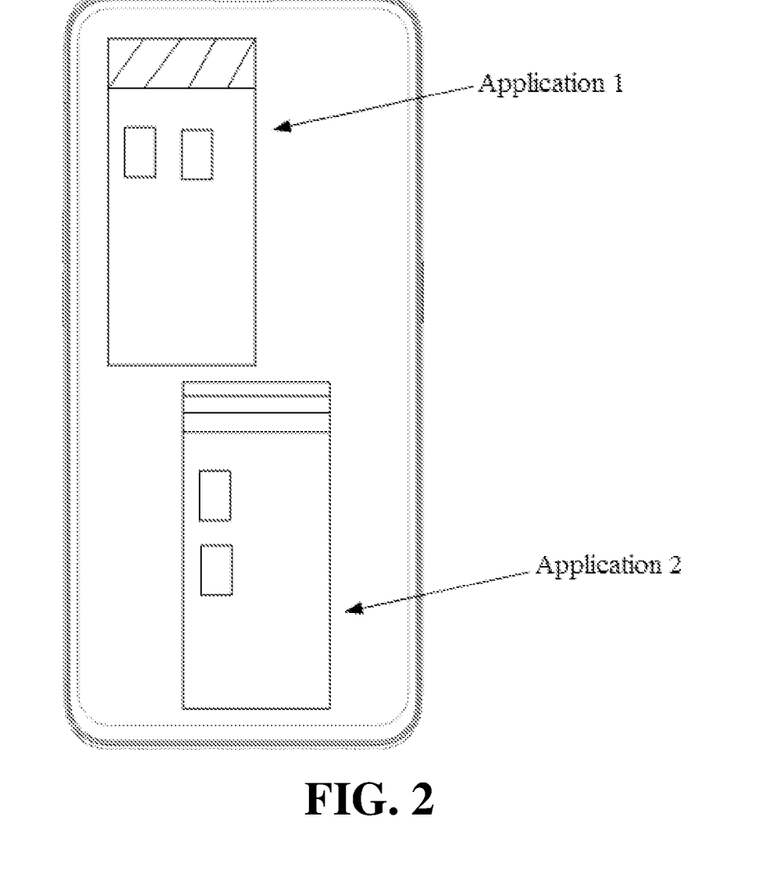
FIG. 2 is a schematic view of multi-window provided by the embodiment I of the present disclosure.

In this step, a terminal device, after receiving a start instruction for an application program, determines whether an application program to be currently started is displayed by means of a Freeform window. The start instruction for the application program can be sent through clicking the application program once or twice. The terminal device has a multi-window user scenario, and its operation system is Android system. Optionally, the terminal device includes a mobile phone or the like. Taking a mobile phone as an example, a multi-window user scenario is as shown in FIG. 2; in FIG. 2, two windows are simultaneously displayed on a screen of the mobile phone.

In this embodiment, a free window mode is a kind of multi-window mode brought by the Android system, in the free window mode, free zooming and free moving of a Freeform window can be implemented. The Freeform window comprises characteristics of an Activity window, such as entire activity, window, focus, input, etc. In addition, the Freeform window can also be displayed above another application by operations such as opening, closing, or the like performed by a user. In the Android system, a difference between the Freeform window and a normal Activity window is that they are located in different Stacks of Activity-Manager management service, and use different stacks to implement functional operations of displaying and scheduling.

Step S12, if the application program to be currently started is displayed by means of a Freeform window, a display interface corresponding to a work task specified by the application program is acquired.

Wherein, the display interface herein refers to a display page of the application program, one application program usually includes a plurality of display pages. Taking the application program "Wechat" as an example, a chat window during chatting with a certain friend is a display interface, and opened "circle of friends" is also a display interface.

As another embodiment, if the application program to be currently started is displayed by a non-Freeform window manner, a display interface defaulted by the application program is acquired. In this embodiment, the display interface corresponding to a work task specified by the application program is usually different from the display interface defaulted by the application program.

Step S13, after the application program is started, the acquired display interface corresponding to the specified work task is displayed in a Freeform window as a display interface of the application program.

As another embodiment, if the display interface defaulted by the application program is acquired, the acquired defaulted display interface is displayed in the Freeform window as a display interface of the application program.

Furthermore, it needs to be further explained that in existing Android systems, there is no special processing for scenarios in which users use multi-window, and the operations are primitive and inconvenient for users to use quickly; inconvenience may be caused for quick operations, such as quickly entering and exiting, or the like of users, and fluency experience is also affected.

Therefore, in this embodiment of the present disclosure, in order to solve the above problem, whether an application program to be currently started is displayed by means of a Freeform window is determined; if the application program to be currently started is displayed by means of a Freeform window, a display interface corresponding to a work task specified by the application program is acquired; and after the application program is started, the acquired display interface corresponding to the specified work task is displayed in a Freeform window as a display interface of the application program. Since the display interface corresponding to the specified work task is used as the display interface of the application program and displayed in the Freeform window, the user does not need to perform operations many times and can directly enter the display interface corresponding to the specified work task, such that the speed of entering the display interface corresponding to the specified work task is improved.

Embodiment II

Figure 3:
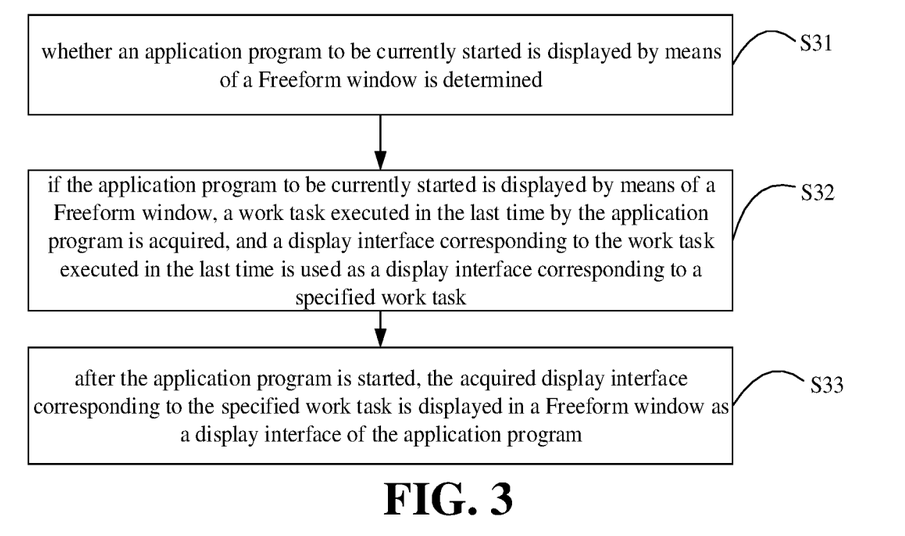
FIG. 3 is a flow chart of a second method for displaying an application program provided by an embodiment II of the present disclosure.

FIG. 3 shows a flow chart of a second method for displaying an application program provided by an embodiment II of the present disclosure. In this embodiment, a step S31 and a step S33 are similar to the step S11 and the step S13 of the embodiment I, and are not repeated here.

Step S31, whether an application program to be currently started is displayed by means of a Freeform window is determined.

Step S32, if the application program to be currently started is displayed by means of a Freeform window, a work task executed in the last time by the application program is acquired, and a display interface corresponding to the work task executed in the last time is used as a display interface corresponding to a specified work task.

In this step, the work task executed in the last time by the application program is usually a work task executed by the application program before exiting, at this time, a display interface when exiting the application program is a display interface corresponding to a work task executed in the last time by the application program; in this way, when the application program is started again, a display interface corresponding to a work task executed in the last time by the application program is used as a display interface corresponding to a specified work task.

Of course, after the display interface corresponding to a work task executed in the last time by the application program is recorded, a display interface corresponding to a work task executed in the last time by the application program recorded in the previous time is deleted.

Step S33, after the application program is started, the acquired display interface corresponding to the specified work task is displayed in a Freeform window as a display interface of the application program.

In this embodiment, after a user starts the application program again, the display interface corresponding to a work task executed in the last time by the application program can be observed in the Freeform window, and the user's intents of starting the application program in two adjacent times are usually the same, therefore, operations required when the user enters the display interface corresponding to a work task executed in the last time by the application program is greatly reduced.

Optionally, the display interface corresponding to a work task executed in the last time by the application program may be acquired by skipping from a display interface of another application program, and a display interface acquired by skipping from a display interface of another application program usually depends on a previous display interface; therefore, in order to be capable of displaying an accurate and effective display interface in the Freeform window when the application program is started again, prior to acquiring a work task executed in the last time by the application program, and using a display interface corresponding to the work task executed in the last time as a display interface corresponding to a specified work task, the following are included.

Whether the display interface corresponding to a work task executed in the last time by the application program is acquired by skipping from a display interface of another application program is determined.

Correspondingly, acquiring a work task executed in the last time by the application program, and using a display interface corresponding to the work task executed in the last time as a display interface corresponding to a specified work task specifically includes the follows.

When determining that the display interface corresponding to a work task executed in the last time by the application program is not acquired by skipping from a display interface of another application program, a display interface corresponding to a work task executed in the last time by the application program is acquired, and a display interface corresponding to the work task executed in the last time is used as a display interface corresponding to a specified work task.

For example, when a user opens a shopping site, a display interface of the shopping site will skip into a display interface of a paying application when paying; at this time, the display interface of the paying application is acquired by skipping from the display interface of the shopping site. In this embodiment, only when determining that the display interface corresponding to a work task executed in the last time by the application program (e.g., the above paying application) is not acquired by skipping from a display interface of another application program, the display interface corresponding to a work task executed in the last time by the application program (e.g., the above paying application) is acquired.

Optionally, the method for displaying an application program further comprises the follows.

If the display interface corresponding to a work task executed in the last time by the application program is acquired by skipping from a display interface of another application program, a display interface before skipping is acquired, and the display interface before skipping is used as the display interface corresponding to the specified work task.

It needs to be explained that if there are a plurality of display interfaces before skipping, the acquired display interface before skipping can be any one display interface before skipping. Preferably, a display interface before the first skipping is acquired. For example, assuming skipping from a display interface A into a display interface B, and further skipping into a display interface C, the display interface A is selected as the display interface corresponding to the specified work task.

In order to describe the above method for acquiring a display interface more clearly, a specific application is described as an example below.

In this embodiment, one display interface corresponds to one activity, a group of skipped display interfaces correspond to one work task. In each task, the activities have sequence relationships, for example, assuming that a task A includes three activities: an activity D1, an activity D2, and an activity D3, and their sequences in the task is (D1, D2, D3), which represents that a display interface D1 skips into a display interface D2, and then the display interface D2 skips into a display interface D3. Of course, skipping between display interfaces needs to meet preset skipping conditions.

In this embodiment, assuming that the display interface corresponding to a work task executed in the last time by the application program corresponds to an activity D4, and the activity D4 is an independent display interface. When determining that the activity D4 is not acquired by skipping from another display interface, a display interface corresponding to the activity D4 is acquired, and the display interface corresponding to the activity D4 is used as the display interface corresponding to the specified work task. When determining that the activity D3 is acquired by skipping from another display interface (a display interface corresponding to the activity D2), the first display interface before skipping (a display interface corresponding to the activity D1) is acquired, and the display interface corresponding to the activity D1 is used as the display interface corresponding to the specified work task. Since the display interface corresponding to the specified work task is acquired according to dependence relationships between display interfaces, more accurate display interfaces can be acquired.

Optionally, if a user starts the same application program in a manner of at least two Freeform windows at the same time, and the terminal device determines that a difference between time points when the user closes the at least two Freeform windows is less than a preset time different threshold value, at this time, acquiring the display interface corresponding to the work task specified by the application program comprises the follows.

If the application program is displayed in a manner of at least two Freeform windows before the last exiting, a display interface on which a focus staying for the longest time is acquired, and the display interface on which a focus staying for the longest time is used as the display interface corresponding to the specified work task.

In this embodiment, the longer the time for a focus to stay on a display interface, the longer the time for a user to operate on the display interface; at this time, acquiring a display interface on which a focus staying for the longest time will be more accurate than acquiring a display interface on which a focus staying for shorter time.

Optionally, a display interface of which a size is the same as that of the application program opened in the previous time is displayed at the same position, such that a display interface of the application program opened in the previous time is restored as much as possible. At this time, if an application program to be currently started is displayed by means of a Freeform window, a position of the application program in a screen when exiting in the last time and/or a size of a Freeform window corresponding to the application program when exiting in the last time are further acquired; correspondingly, the after the application program is started, displaying the acquired display interface corresponding to the specified work task in a Freeform window as a current display interface of the application program specifically comprises the follows.

After the application program is started, the acquired display interface corresponding to the specified work task is displayed in a Freeform window as a display interface of the application program, and a position of the Freeform window in a screen is the same as a position of the application program in the screen when exiting in the last time, and/or a size of the Freeform window is the same as a size of a Freeform window corresponding to the application program when exiting in the last time.

In this embodiment, the display interface corresponding to the specified work task displayed at the same position is located at a front end of the terminal device, and a current focus is located in a Freeform window displaying the display interface corresponding to the specified work task.

Optionally, after a user starts an application program again, he/she may not hope that the started application covers an opened application program. At this time, if an application program to be currently started is displayed by means of a Freeform window, a position of the application program in a screen when exiting in the last time and a size of a Freeform window corresponding to the application program when exiting in the last time are further acquired; correspondingly, the after the application program is started, displaying the acquired display interface corresponding to the specified work task in a Freeform window as a display interface of the application program specifically comprises the follows.

After the application program is started, whether a position of a Freeform window displayed on a current screen is the same as a position of the application program in the screen when exiting in the last time is determined; if they are the same, whether an area of the current screen that does not display any Freeform window is larger than or equal to a size of a Freeform window corresponding to the application program when exiting in the last time is determined; if the area is larger than or equal to a size of a Freeform window corresponding to the application program when exiting in the last time, the acquired display interface corresponding to the specified work task is displayed in a Freeform window as a display interface of the application program; and a size of the Freeform window is the same as a size of a Freeform window corresponding to the application program when exiting in the last time, and a position of the Freeform window in the screen is in the area of the current screen that does not display any Freeform window.

In this embodiment, after the application program is started again, a position of its corresponding Freeform window in a screen is in an area of the current screen that does not display any Freeform window; therefore, other displayed Freeform windows will not be covered, and thus good experience of users is improved.

It should be understood that the value of the sequence number of each operation in the above embodiments does not mean the order of execution. The execution sequence of each process should be determined by its function and internal logic, and should not constitute any limitation to the implementation processes of the embodiments of the present disclosure.

Embodiment III

Figure 4:
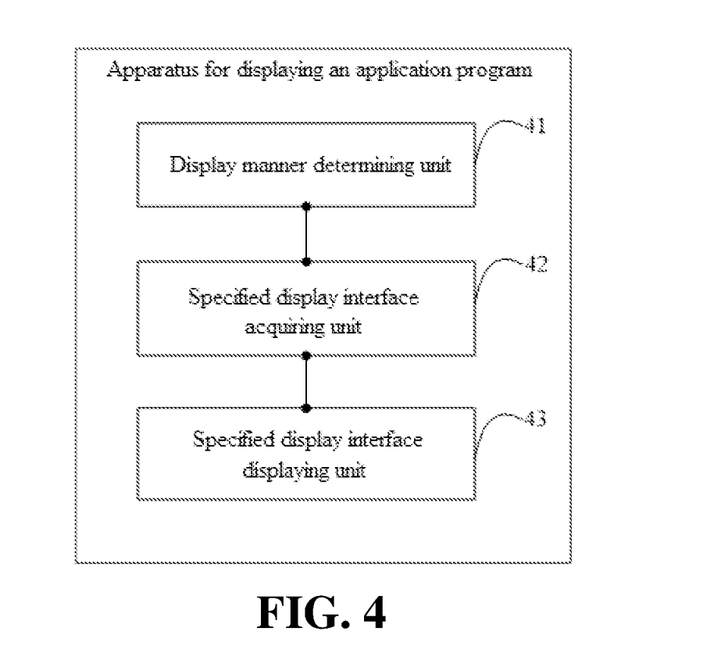
FIG. 4 is a structural schematic diagram of an apparatus for displaying an application program provided by an embodiment III of the present disclosure.

FIG. 4 shows a structural schematic diagram of an apparatus for displaying an application program provided by an embodiment III of the present disclosure, the apparatus for displaying an application program can be applied in a terminal device. In order to describe easily, only parts related to embodiments of the present disclosure are shown.

The apparatus for displaying an application program comprises a display manner determining unit 41, a specified display interface acquiring unit 42, and a specified display interface displaying unit 43. Wherein: the display manner determining unit 41 is configured to determine whether an application program to be currently started is displayed by means of a Freeform window; the specified display interface acquiring unit 42 is configured to: if the application program to be currently started is displayed by means of a Freeform window, acquire a display interface corresponding to a work task specified by the application program, wherein the display interface herein refers to a display page of the application program; the specified display interface displaying unit 43 is configured to: after the application program is started, display the acquired display interface corresponding to the specified work task in a Freeform window as a display interface of the application program.

In some embodiments, the apparatus for displaying an application program further comprises a defaulted display interface displaying unit configured to: if the application program to be currently started is displayed by means of non-Freeform window, acquire a display interface defaulted by the application program, and display the acquired defaulted display interface in a Freeform window as a display interface of the application program.

Optionally, the specified display interface acquiring unit 42 is specifically configured to: if the application program to be currently started is displayed by means of a Freeform window, acquire a work task executed in the last time by the application program, and use a display interface corresponding to the work task executed in the last time as a display interface corresponding to a specified work task.

Optionally, the apparatus for displaying an application program further comprises: a display interface skipping determining unit configured to determine whether the display interface corresponding to a work task executed in the last time by the application program is acquired by skipping from a display interface of another application program.

Correspondingly, the specified display interface acquiring unit 42 is specifically configured to: when determining that the display interface corresponding to a work task executed in the last time by the application program is not acquired by skipping from a display interface of another application program, acquire a display interface corresponding to a work task executed in the last time by the application program, and use a display interface corresponding to the work task executed in the last time as a display interface corresponding to a specified work task.

Optionally, the apparatus for displaying an application program further comprises: a first display interface acquiring unit configured to: if the display interface corresponding to a work task executed in the last time by the application program is acquired by skipping from a display interface of another application program, acquire a display interface before skipping, and use the display interface before skipping as the display interface corresponding to the specified work task.

Optionally, the specified display interface acquiring unit 42 is specifically configured to: if the application program is displayed in a manner of at least two Freeform windows before the last exiting, acquire a display interface on which a focus staying for the longest time, and use the display interface on which a focus staying for the longest time as the display interface corresponding to the specified work task.

Optionally, if an application program to be currently started is displayed by means of a Freeform window, a position of the application program in a screen when exiting in the last time and/or a size of a Freeform window corresponding to the application program when exiting in the last time are further acquired by the specified display interface acquiring unit 42; and the specified display interface displaying unit 43 is specifically configured to: after the application program is started, display the acquired display interface corresponding to the specified work task in a Freeform window as a display interface of the application program, wherein a position of the Freeform window in a screen is the same as a position of the application program in the screen when exiting in the last time, and/or a size of the Freeform window is the same as a size of a Freeform window corresponding to the application program when exiting in the last time.

Optionally, if an application program to be currently started is displayed by means of a Freeform window, a position of the application program in a screen when exiting in the last time and/or a size of a Freeform window corresponding to the application program when exiting in the last time are further acquired by the specified display interface acquiring unit 42; the specified display interface displaying unit 43 is specifically configured to: after the application program is started, determine whether a position of a Freeform window displayed on a current screen is the same as a position of the application program in the screen when exiting in the last time; if they are the same, determine whether an area of the current screen that does not display any Freeform window is larger than or equal to a size of a Freeform window corresponding to the application program when exiting in the last time; if the area is larger than or equal to a size of a Freeform window corresponding to the application program when exiting in the last time, display the acquired display interface corresponding to the specified work task in a Freeform window as a display interface of the application program; wherein a size of the Freeform window is the same as a size of a Freeform window corresponding to the application program when exiting in the last time, and a position of the Freeform window in the screen is in the area of the current screen that does not display any Freeform window.

In this embodiment of the present disclosure, since the display interface corresponding to the specified work task is used as the display interface of the application program and displayed in the Freeform window, the user does not need to perform operations many times and can directly enter the display interface corresponding to the specified work task, such that the speed of entering the display interface corresponding to the specified work task is improved.

Embodiment IV

Figure 5:
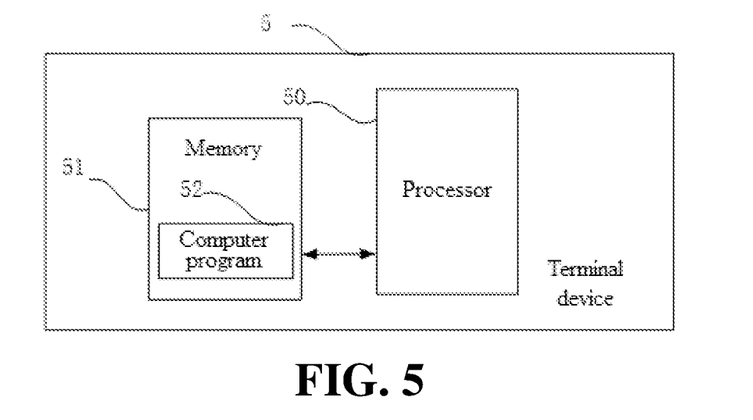
FIG. 5 is a schematic diagram of a terminal device provided by an embodiment IV of the present disclosure.

FIG. 5 is a schematic diagram of a terminal device provided by an embodiment of the present disclosure. As shown in FIG. 5, the terminal device 5 in this embodiment comprises: a processor 50, a memory 51, and a computer program 52 stored in the memory 51 and being executable in the processor 50. The processor 50, when executing the computer program 52, implements steps of the above embodiments of the method for displaying an application program, such as the steps S11-S13 shown in FIG. 1. Alternatively, the processor 50, when executing the computer program 52, implements functions of the modules/units in the above apparatus embodiments, such as the functions of the modules 41-43 shown in FIG. 4.

Exemplarily, the computer program 52 can be divided into one or more module/unit, the one or more module/unit is stored in the memory 51, and is executed by the processor 50 to complete the present disclosure. The one or more module/unit can be a series of computer program instruction segments that can complete certain functions, these instruction segments are used to describe the execution process of the computer program 52 in the terminal device 5. For example, the computer program 52 can be divided into a display manner determining unit, a specified display interface acquiring unit, and a specified display interface displaying unit. Specific functions of these units are as follows.

The display manner determining unit is configured to determine whether an application program to be currently started is displayed by means of a Freeform window.

The specified display interface acquiring unit is configured to: if the application program to be currently started is displayed by means of a Freeform window, acquire a display interface corresponding to a work task specified by the application program.

The specified display interface displaying unit is configured to: after the application program is started, display the acquired display interface corresponding to the specified work task in a Freeform window as a display interface of the application program.

The terminal device 5 can be a computing device such as a desktop computer, a notebook computer, a palm computer, a cloud server, etc. The terminal device 5 can comprise, but is not limited to, the processor 50 and the memory 51. Those skilled in the art can understand that FIG. 5 is merely an example of the terminal device 5 and does not construct any limitation to the terminal device 5. It is possible to include components more than or less than shown in the drawings, or combination of some components, or different components, for example, the terminal device can further comprise an input/output device, a network access device, a bus, etc.

The processor 50 can be a central processing unit (CPU), and can also be other universal processors, digital signal processors (DSP), application specific integrated circuits (ASIC), field-programmable gate arrays (FPGA), or other programmable logic devices, discrete gates or transistor logic devices, discrete hardware components, and so on. The universal processor can be a microprocessor, or the processor can also be any conventional processor, etc.

The memory 51 can be an internal storage unit of the terminal device 5, for example, a hard disk or a memory module of the terminal device 5. The memory 51 can also be an external storage device for the terminal device 5, for example, a plug-in hard disk, a smart media card (SMC), a secure digital (SD) card, a flash card, or the like equipped for the terminal device 5. Furthermore, the memory 51 can also include not only an internal storage unit of the terminal device 5 but also an external storage device. The memory 51 is used to store the computer program and other programs and data required by the terminal device. The memory 51 can also be used to temporarily store data that has been output or will be output.

Those skilled in the art can clearly understand that for the convenience and conciseness of the description, only the division of the above-mentioned functional units and modules is used as an example to illustrate. In practical applications, the above-mentioned functions can be allocated to different functional units and modules to complete as required. That is, the internal structure of the apparatus is divided into different functional units or modules to complete all or some of the functions described above. The functional units and modules in the embodiments can be integrated into one processing unit, or each unit can also exist alone physically, or two or more units can also be integrated into one unit. The above-mentioned integrated units can be implemented in the form of hardware, and can also be implemented in the form of software functional unit. In addition, the specific names of the functional units and modules are only for the convenience of distinguishing each other, and are not used to limit the protection scope of the present disclosure. For specific working processes of the units and modules in the foregoing system, reference may be made to corresponding processes in the foregoing method embodiments, which are not repeated here.

In the above embodiments, the description of each embodiment has its own emphasis. For parts that are not described in detail or recorded in a certain embodiment, reference may be made to related descriptions of other embodiments.

One of ordinary skill in the art can be aware that the modules, units and/or method steps of the examples described in combination with the embodiments disclosed herein can be implemented by electronic hardware or a combination of computer software and electronic hardware. Whether these functions are executed by hardware or software depends on the specific application and design constraint conditions of the technical solution. Professional technicians can use different methods for each specific application to implement the described functions, but such implementation should not be considered as going beyond the scope of the present disclosure.

In the embodiments provided by the present disclosure, it should be understood that the disclosed apparatuses/terminal devices and methods may be implemented in other ways. For example, the apparatus/terminal device embodiments described above are merely illustrative. For example, the division of the modules or units is only a logical function division. In actual implementation, there may be other division methods, for example, multiple units or components may be combined or may be integrated into another system, or some features can be ignored or not implemented. In addition, the displayed or discussed mutual coupling, or direct coupling, or communication connection, may be indirect coupling or communication connection through some interfaces, devices or units, and may be in electrical, mechanical or other forms.

The units described as separate components may be or may not be physically separated, and the components displayed as units may be or may not be physical units, that is, they may be located in one place, or may also be distributed on multiple network units. Some or all of the units may be selected according to actual requirements to achieve the objectives of the solutions of the embodiments.

In addition, the functional units in the various embodiments of the present disclosure may be integrated into one processing unit, or each unit may physically exist alone, or two or more units may be integrated into one unit. The above-mentioned integrated unit can be implemented in the form of hardware, and can also be implemented in the form of software functional units.

If the integrated modules/units are implemented in the form of software functional units and sold or used as independent products, they can be stored in a computer readable storage medium. Based on such understanding, all or some of the processes of the methods in the above-mentioned embodiments implemented by the present disclosure can also be completed by instructing relevant hardware through a computer program. The computer program can be stored in a computer readable storage medium. When the computer program is executed by a processor, the steps of the foregoing method embodiments can be implemented. Wherein, the computer program includes computer program codes, and the computer program codes may be in the form of source codes, object codes, executable files, or some intermediate forms, etc. The computer readable medium may include: any entity or device capable of carrying the computer program codes, recording mediums, U-disks, mobile hard disks, magnetic disks, optical disks, computer memories, read-only memories (ROM, Read-Only Memory), random access memories (RAM, Random Access Memory), electrical carrier signals, telecommunications signals, software distribution media, and so on. It should be noted that the content contained in the computer readable medium can be appropriately added or deleted in accordance with the requirements of the legislation and patent practice in a jurisdiction. For example, in some jurisdictions, according to the legislation and patent practice, the computer readable medium does not include electrical carrier signals and telecommunication signals.

The above-mentioned embodiments are only intended to illustrate but not to limit the technical solutions of the present disclosure. Although the present disclosure has been described in detail with reference to the foregoing embodiments, those of ordinary skill in the art should understand that: the technical solutions recorded in the foregoing embodiments can still be modified, or some of the technical features thereof can be equivalently replaced; these modifications or replacements do not cause the essence of corresponding technical solutions to deviate from the spirit and scopes of the technical solutions of the embodiments of the present disclosure, and should be all included in the protection scope of the present disclosure.

What is claimed is:

1. A method for displaying an application program, comprising:

in response to that the application program to be currently started is set to be displayed by at least one Freeform window on a current screen, acquiring a display interface corresponding to a work task specified by the application program, comprising:

determining whether the display interface corresponding to a work task executed in a last time by the application program is acquired by skipping from a display interface of another application program, comprising:

in response to determining that the display interface corresponding to the work task executed in the last time by the application program is not acquired by skipping from the display interface of another application program, acquiring the display interface corresponding to the work task executed in the last time by the application program, and using the acquired display interface corresponding to the work task executed in the last time as the display interface corresponding to the specified work task; or in response to determining that the display interface corresponding to the work task executed in the last time by the application program is acquired by skipping from the display interface of another application program, acquiring a display interface before the skipping, and using the acquired display interface before the skipping as the display interface corresponding to the specified work task; and in response to determining that the application program is started, displaying the acquired display interface corresponding to the specified work task in the at least one Freeform window as a display interface of the application program.

2. The method according to claim 1, wherein, in response to that the application program to be currently started is set to be displayed by the at least one Freeform window, acquiring a position of a Freeform window corresponding to the application program in a screen when exiting in a last time and/or a size of the Freeform window corresponding to the application program when exiting in the last time;

wherein the displaying the acquired display interface corresponding to the specified work task in the at least one Freeform window as the display interface of the application program comprises:

displaying the acquired display interface corresponding to the specified work task in the at least one Freeform window at a position that is the same as the acquired position of the Freeform window corresponding to the application program in the screen when exiting in the last time, and/or with a size that is the same as the acquired size of the Freeform window corresponding to the application program when exiting in the last time.

3. The method according to claim 1, wherein, in response to that the application program to be currently started is set to be displayed by the at least one Freeform window, acquiring a position of a Freeform window corresponding to the application program in a screen when exiting in a last time and a size of the Freeform window corresponding to the application program when exiting in the last time;

wherein the displaying the acquired display interface corresponding to the specified work task in the at least one Freeform window as the display interface of the application program comprises:

determining whether a position of the at least one Freeform window displayed on the current screen is the same as the acquired position of the Freeform window corresponding to the application program in the screen when exiting in the last time;

when it is determined that they are the same, determining whether an area of the current screen that does not display any Freeform window is larger than or equal to the acquired size of the Freeform window corresponding to the application program when exiting in the last time; and when it is determined that the area is larger than or equal to the acquired size of the Freeform window corresponding to the application program when exiting in the last time, displaying the acquired display interface corresponding to the specified work task in the at least one Freeform window as the display interface of the application program;

wherein a size of the at least one Freeform window is the same as the acquired size of the Freeform window corresponding to the application program when exiting in the last time, and a position of the at least one Freeform window is in the area of the current screen that does not display any Freeform window.

4. A terminal device comprising a memory, a processor, and a computer program stored in the memory and being executable in the processor, wherein the processor, when executing the computer program, implements operations of:

in response to that an application program to be currently started is set to be displayed by at least one Freeform window on a current screen, acquiring a display interface corresponding to a work task specified by the application program, comprising:

determining whether the display interface corresponding to a work task executed in a last time by the application program is acquired by skipping from a display interface of another application program, comprising:

in response to determining that the display interface corresponding to the work task executed in the last time by the application program is not acquired by skipping from the display interface of another application program, acquiring the display interface corresponding to the work task executed in the last time by the application program, and using the acquired display interface corresponding to the work task executed in the last time as the display interface corresponding to the specified work task; or in response to determining that the display interface corresponding to the work task executed in the last time by the application program is acquired by skipping from the display interface of another application program, acquiring a display interface before the skipping, and using the acquired display interface before the skipping as the display interface corresponding to the specified work task; and in response to determining that the application program is started, displaying the acquired display interface corresponding to the specified work task in the at least one Freeform window as a display interface of the application program.

5. The terminal device according to claim 4, wherein, in response to that the application program to be currently started is set to be displayed by the at least one Freeform window, acquiring a position of a Freeform window corresponding to the application program in a screen when exiting in a last time and/or a size of the Freeform window corresponding to the application program when exiting in the last time;

wherein the displaying the acquired display interface corresponding to the specified work task in the at least one Freeform window as the display interface of the application program comprises:

displaying the acquired display interface corresponding to the specified work task in the at least one Freeform window at a position that is the same as the acquired position of the Freeform window corresponding to the application program in the screen when exiting in the last time, and/or with a size that is the same as the acquired size of the Freeform window corresponding to the application program when exiting in the last time.

6. The terminal device according to claim 4, wherein, in response to that the application program to be currently started is set to be displayed by at least one Freeform window, acquiring a position of a Freeform window corresponding to the application program in a screen when exiting in a last time and a size of the Freeform window corresponding to the application program when exiting in the last time;

wherein the displaying the acquired display interface corresponding to the specified work task in the at least one Freeform window as the display interface of the application program comprises:

determining whether a position of the at least one Freeform window displayed on a the current screen is the same as the acquired position of the Freeform window corresponding to the application program in the screen when exiting in the last time;

when it is determined that they are the same, determining whether an area of the current screen that does not display any Freeform window is larger than or equal to the acquired size of the Freeform window corresponding to the application program when exiting in the last time; and when it is determined that the area is larger than or equal to the acquired size of the Freeform window corresponding to the application program when exiting in the last time, displaying the acquired display interface corresponding to the specified work task in the at least one Freeform window as the display interface of the application program;

wherein a size of the at least one Freeform window is the same as the acquired size of the Freeform window corresponding to the application program when exiting in the last time, and a position of the at least one Freeform window is in the area of the current screen that does not display any Freeform window.

7. A non-transitory computer readable storage medium, wherein the non-transitory computer readable storage medium stores a computer program, and the computer program, when being executed by a processor, implements operations of:

in response to that an application program to be currently started is set to be displayed by at least one Freeform window on a current screen, acquiring a display interface corresponding to a work task specified by the application program, comprising:

determining whether the display interface corresponding to a work task executed in a last time by application program is acquired by skipping from a display interface of another application program, comprising:

in response to determining that the display interface corresponding to the work task executed in the last time by the application program is not acquired by skipping from the display interface of another application program, acquiring the display interface corresponding to the work task executed in the last time by the application program, and using the acquired display interface corresponding to the work task executed in the last time as the display interface corresponding to the specified work task; or in response to determining that the display interface corresponding to the work task executed in the last time by the application program is acquired by skipping from the display interface of another application program, acquiring a display interface before the skipping, and using the acquired display interface before the skipping as the display interface corresponding to the specified work task; and in response to determining that the application program is started, displaying the acquired display interface corresponding to the specified work task in the at least one Freeform window as a display interface of the application program.

* * * * *